(12) United States Patent
Sin Xicola et al.

(10) Patent No.: US 11,274,721 B2
(45) Date of Patent: Mar. 15, 2022

(54) FRICTION MATERIAL, IN PARTICULAR FOR THE MANUFACTURING OF A BRAKE PAD, AND ASSOCIATED PREPARATION METHOD

(71) Applicant: ITT Italia S.r.l., Lainate (IT)

(72) Inventors: Agustin Sin Xicola, Barge (IT); Luca Martinotto, Barge (IT); Paolo Galimberti, Barge (IT)

(73) Assignee: ITT Italia S.r.l.

( * ) Notice: Subject to any disclaimer, the term of this patent is extended or adjusted under 35 U.S.C. 154(b) by 167 days.

(21) Appl. No.: 15/572,291

(22) PCT Filed: May 6, 2016

(86) PCT No.: PCT/IB2016/052608
§ 371 (c)(1),
(2) Date: Nov. 7, 2017

(87) PCT Pub. No.: WO2016/178192
PCT Pub. Date: Nov. 10, 2016

(65) Prior Publication Data
US 2018/0128335 A1    May 10, 2018

(30) Foreign Application Priority Data
May 7, 2015    (IT) .......................... TO2015A000243

(51) Int. Cl.
*F16D 69/02*    (2006.01)
(52) U.S. Cl.
CPC .... *F16D 69/026* (2013.01); *F16D 2200/0013* (2013.01); *F16D 2200/0021* (2013.01);
(Continued)

(58) Field of Classification Search
CPC .......... F16D 69/026; F16D 2200/0013; F16D 2200/0021; F16D 2200/0065;
(Continued)

(56) References Cited

U.S. PATENT DOCUMENTS

| | | | | |
|---|---|---|---|---|
| 6,107,386 A | * | 8/2000 | Nakajima | F16D 69/026 523/149 |
| 2005/0004258 A1 | * | 1/2005 | Yamamoto | F16D 69/026 523/149 |

(Continued)

FOREIGN PATENT DOCUMENTS

| | | |
|---|---|---|
| CN | 104017541 A | 9/2014 |
| CN | 104194258 A | 12/2014 |

(Continued)

OTHER PUBLICATIONS

Graphene: A New Emerging Lubricant; Berman et al.; Materials Today; vol. 17, No. 1, pp. 31-42; Jan./Feb. 2014; Elsevier Ltd; ©2014; 12 pages.

(Continued)

*Primary Examiner* — Alexander C Kollias
(74) *Attorney, Agent, or Firm* — Barclay Damon LLP (57) ABSTRACT

An asbestos-free friction material includes inorganic and/or organic and/or metallic fibers, at least one binder, at least one friction modifier or lubricant, at least one filler or abrasive and a carbonaceous material constituted by a microstructure. The microstructure is in the form of flakes or scales of micrometric planar dimensions and of nanometric thickness consisting of a substantially pure graphene mono- or multilayers, preferably pre-blended with at least part of the organic binder.

10 Claims, 5 Drawing Sheets

(52) U.S. Cl.
CPC ............... *F16D 2200/0065* (2013.01); *F16D 2200/0069* (2013.01); *F16D 2200/0073* (2013.01); *F16D 2200/0082* (2013.01); *F16D 2250/0023* (2013.01)

(58) Field of Classification Search
CPC ..... F16D 2200/0069; F16D 2200/0073; F16D 2200/0082; F16D 2250/0023; C09K 3/149
See application file for complete search history.

(56) References Cited

U.S. PATENT DOCUMENTS

| | | | | |
|---|---|---|---|---|
| 2011/0046026 A1* | 2/2011 | Xiao | ....................... | B82Y 30/00 508/113 |
| 2011/0210282 A1* | 9/2011 | Foley | ..................... | B82Y 25/00 252/62.51 R |
| 2012/0217434 A1* | 8/2012 | l'Abee et al. | ............ | C09K 5/14 252/74 |
| 2012/0322917 A1* | 12/2012 | Alcazar Jorba | ......... | C01B 32/23 523/468 |
| 2013/0015409 A1* | 1/2013 | Fugetsu | ................ | B82Y 30/00 252/500 |
| 2013/0244009 A1* | 9/2013 | Jesudoss | .................. | B41J 2/005 428/195.1 |
| 2014/0117745 A1 | 5/2014 | Wilke et al. | | |
| 2015/0014577 A1* | 1/2015 | Chowdhury | ........... | C08G 77/50 252/75 |
| 2017/0158618 A1 | 6/2017 | Holland et al. | | |

FOREIGN PATENT DOCUMENTS

| | | |
|---|---|---|
| CN | 104405807 A | 3/2015 |
| KR | 10-2010-0091750 | 8/2010 |
| WO | WO 2014/145227 A1 | 9/2014 |
| WO | WO 2014/145231 A2 | 9/2014 |

OTHER PUBLICATIONS

International Search Report and Written Opinion for PCT/IB/2016/052608; dated Jul. 12, 2016; 8 pages.
Japanese Notice of Reasons for Refusal for JP 2017-558495; dated Feb. 19, 2020; 4 pages.
European Office Action for EP 16 726 956.2; dated Mar. 3, 2020; 4 pages.
European Office Action for EP 16 726 956.2; dated Mar. 3, 2020; 10 pages.

* cited by examiner

FRICTION MATERIAL, IN PARTICULAR FOR THE MANUFACTURING OF A BRAKE PAD, AND ASSOCIATED PREPARATION METHOD

CROSS REFERENCE TO RELATED APPLICATIONS

This application is a national stage application under 35 U.S.C. § 371 of International Application No. PCT/IB2016/052608, filed May 6, 2016, which claims priority of Italian Patent Application No. TO2015A000243, filed May 7, 2015, the entire contents of each application being herein incorporated by reference.

TECHNICAL FIELD OF THE INVENTION

The present invention relates to a friction material that is particularly suitable for the manufacturing of brake pads. The invention also relates to a method for preparing such a friction material, which is used for the manufacturing of friction layers/blocks for friction elements such as braking elements, for example vehicle brake pads or brake shoes, and/or clutch discs. The friction material and the associated preparation method are suitable for the manufacturing of friction materials that are asbestos-free, for example belonging to the classes of friction materials known as NAO ("Asbestos-free Organic friction material"), "Low Steel" and "Semi-met".

PRIOR ART

The friction materials of the above type include five classes of components: a fibrous material made from inorganic and/or organic and/or metallic fibers, a binder, a "filler", one or more lubricants or friction modifiers, one or more abrasives. To a great extent asbestos was used in the past as the fibrous material, which material however presents considerable environmental problems and has well known toxic effects on human health and for this reason has been banned by legislation for a long time. This material has therefore been replaced with other materials, both inorganic, such as rock wool, wollastonite and fiberglass, and organic, such as aramid fibers and carbon fibers, as well as metallic such as copper, tin, iron, aluminum and steel powders or fibers, and other metals or metal alloys, such as bronze and brass. The binder is generally a thermosetting polymer, for example based on phenolic resins, which can be found on the market both in solid form (powder) and in liquid form, for example, if based on resoles. Various materials are used as a filler such as barite (barium sulfate), calcium carbonate, talc, magnesium oxide, vermiculite; as abrasives, zirconium silicate, zirconium oxide, alumina, silicon carbide, mica; as friction modifiers metal sulfides such as molybdenum disulfide, iron sulfides, copper, tin, graphite and/or coke. Other classes of materials are then added in smaller percentages such as, for example, rubber in powder or granule form, "friction dust", other organic materials.

Various national and international regulations require the use of friction materials that are not only free of asbestos and heavy metals, but also with a reduced or zero copper content. However, more than others, friction materials that are copper-free involve a decay over time in the coefficient of friction, in particular in the presence of increased temperature due to repeated braking.

A new material called graphene has been known about in the art for a long time. Graphene is an allotrope of carbon in the form of a two-dimensional hexagonal lattice of carbon atoms present at the vertices of the hexagonal lattice. It can also be considered as an indefinitely large aromatic molecule.

Graphene is commercially available in two forms:
particles of nanographite with a purity that is higher than 98%, morphologically flat, having a nanometric thickness and planar micrometric width, in which each particle comprises one or more sheets of graphene, with a thickness ranging between 0.34 nm and 40 nm. The particles have a planar width within a range from about 1 to 50 microns. At the micrometric level this graphene has the appearance of aggregates of thin piles of graphene sheets. A product of this type is currently marketed under the trade name ULTRA GRAPHENE G+® by the company DIRECTA PLUS.
dry powder made of nano graphene platelets in the form of flakes. The flakes have a lateral dimension of less than 10 microns and a thickness of less than 4 nm and up to 0.142 nm (thickness of a monoatomic layer of carbon), for example marketed under the name PURE GRAPHENE G+®, again from the company DIRECTA PLUS. The high purity of these nano platelets, together with their small size and at a manageable density make the PureG+® an additive that is ready to be dispersed within any type of material.

According to Berman et al., "Materials Today", ELSEVIER, vol. 17, Issue 1 (January/February 2014), graphene can be used in liquid lubricants, or else by itself as a solid lubricant, depositing it on a surface in thin layers by means of vapor phase deposition techniques (CVD).

US2007158618A1 teaches the use of a thin layer of graphene in the production of discs or brake drums. According to US2014117745A1 a layer of graphene is deposited onto the edges of a bicycle wheel in order to constitute a friction surface having wear resistance and a desired roughness and being suitable for coupling with traditional braking elements. WO2014145227A1 teaches the covering of the surface of a disc or brake drum with a layer of graphene in order to increase the wear resistance and to achieve a desired roughness, which improves the braking characteristics in that it allows air to flow between the brake disc and the braking element, made from traditional type brake pads. WO2014145231A2 similarly teaches the covering of a brake disc with graphene in order to reduce the wear therein and especially to protect it from corrosion.

Finally, US20130015409A1 teaches a method for making a friction material containing graphene, by impregnating a thin sheet of paper and aramid fibers with a liquid blend of a graphene oxide; the thus impregnated sheet is subjected to chemical reduction in order to obtain graphene in situ, added to an organic binder and polymerized, thus obtaining a thin layer of friction material. It is however clear that this product cannot be used as such in vehicles in common use such as automobiles.

KR20100091750 proposes for the first time the use of graphene in friction materials intended for the production of brake pads for vehicles. However, due to the fact that the graphene is an expensive material that is difficult to blend in friction material formulations, the practical applications of the graphene in friction materials for brake pads for vehicles are actually unknown.

SUMMARY OF THE INVENTION

The object of the present invention is to provide a friction material to be used for the manufacturing of friction layers/ blocks for friction elements as brake elements, for example vehicle brake pads or brake shoes, and/or clutch discs, which is preferably devoid of materials that are potentially harmful to health, is suitable for industrial production on a large scale and has tribological characteristics that are comparable to or better than those of existing friction materials.

The invention therefore relates to a friction material to be used for the manufacturing of friction layers/blocks for friction elements as braking elements, for example vehicle brake pads or brake shoes, and/or clutch discs, as defined in claim 1.

In particular, the friction material according to the invention comprises as component materials inorganic and/or organic and/or metallic fibers, at least one binder which is generally organic but also inorganic, at least one friction modifier or lubricant including a carbonaceous material and at least one filler or abrasive. The carbonaceous material is made of, as a whole or in part, a microstructure in flakes or scales of micrometric planar dimensions and of nanometric thickness consisting of substantially pure graphene mono- or multilayers.

The scales or flakes of graphene of micrometric planar dimensions and of nanometric thickness are uniformly dispersed within a matrix which is predominantly or completely comprised of a binder, preferably organic. Dispersed within the organic binder matrix are the other components of the friction material that are different from the organic binder.

In particular, the scales or flakes of graphene include up to 280 monoatomic layers of graphene and have lateral dimensions of less than 50 microns and a thickness of less than 40 nm and preferably include up to 30 monoatomic layers of graphene and have lateral dimensions of less than 10 microns and a thickness of less than 4 nm.

In essence, a part or all of the traditional graphite content present within the friction material formulations currently in use is replaced with graphene without substantially modifying the rest of the formulations, which, instead, can include coke, which is useful due to its morphology and/or chemical structure.

Graphene, in the form of powder made from flakes or planar scales formed by monolayers or by multiple layers of graphene, in which the scales or flakes have a nanometric thickness and micrometric dimensions in plan view (width and length), can be added to the other component materials of the formulation at different stages of the production process.

In particular, graphene can be directly pre-inserted into the synthetic resin or blend of synthetic resins that constitutes the organic binder by the resin manufacturer itself. Alternatively it can be blended with the binder, in this case an organic and/or inorganic binder, and with all of the other components of the formulation in a Henschel, Loedige or Eirich type blender.

According to a preferred aspect of the invention, the mixing of graphene with the other raw components of the formulation does not take place simply by adding graphene to a blender of the type cited above, but rather, a complex blending method is performed comprising a first step of hot blending by a first roller blender that is open to atmospheric pressure, in which step at least part of an organic binder, the entire amount of the graphene required by the formulation and, optionally, at least part of one or more of the other component materials of the friction material are fed to said first blender that is open to atmospheric pressure and equipped with at least two heated rotating rollers, in order to have said at least part of the organic binder, of the entire amount of the graphene required by the formulation and, optionally, of at least part of one or more of the other component materials of the friction material passing through the rollers, in a gap delimited there between, at a temperature lower than the polymerization or curing temperature of the organic binder but greater than, or equal to, the organic binder softening temperature and preferably higher than the complete melting temperature of the organic binder.

In this way, the graphene that participates in the first hot blending step mixes with the organic binder, which takes it to a fluid state, under the high shear stress exerted by the rotating rollers of the first blender, obtaining at the output of the first blender, for subsequent cooling of the paste thus formed, a solid semi-finished product in the form of micrometric sized scales or ribbon or sheet.

Subsequently, a grinding step is performed, for example by means of a ball or hammer mill, wherein the semifinished solid product containing the graphene is reduced to a fine powder, which is preferably sieved in order to reduce it to a particle size distribution of between 5 and 500 microns.

A traditional type of second blending step is also carried out with the solid raw friction material components performed previously, after, or both before and after the steps of blending graphene with the organic binder using hot rollers and grinding the semi-finished sheet or scales or ribbon thus obtained; the second mixing step is performed in a second traditional blender, such as of the Henschel, Loedige or Eirich type.

Preferably, in the first hot blending step, in order to obtain the solid semi-finished product, all of the organic binder and all of the graphene are mixed together, operating at a temperature that is higher than that of the liquefaction of the organic binder, which is preferably a powder, so that this can, during the blending phase and due to the effect of the shear stress applied by the rollers, assume a completely fluid state in order to more easily incorporate the graphene, which is added to the blender, preferably in solid powder form. The powder thus obtained by the milling of the solid semi-finished product containing graphene undergoes a sieving step. Consequently, the powder obtained by grinding the solid semi-finished product that is used to form the raw mixture formulation has a controlled particle size distribution of between 5 and 500 microns.

Subsequently, this powder obtained by grinding the solid semi-finished product, containing the organic binder and graphene, is blended with every other raw component of the formulation chosen in a Henschel, Loedige or Eirich type blender according to a conventional process.

The first step of hot blending is performed by adding all of the organic binder, preferably in powder form, and all of the graphene to a hopper arranged above at least one pair of motorized and contra-rotating heated cylinders. Even if not preferred, the mixing, during such a step, of the organic binder with graphene and/or with at least one other raw solid component of the friction material formulation which is to be produced is not to be excluded.

Pressing and Mixture Composition Process

The method for the use of graphene in a friction material according to the invention also comprises, in addition to one or more of the previously described blending steps, a pressing step, for example, under heat and under pressure, of the raw mixture containing graphene in order to obtain a block of friction material that can be used in practice. This pressing step is performed in the traditional way, with the only difference being that among the components placed into the die there is also the previously blended graphene, or the powder obtained by grinding the solid semi-finished product obtained by blending some or all of the desired components, including all of the graphene, using the motorized roller mixer that is open to the atmosphere.

In this pressing step, the raw mixture is placed into a die within which a suitably treated metallic support or backplate is also arranged, so that during the pressing step, not only is the layer or block of friction material formed, but the adhesion of such a layer or block to the metal support is also obtained.

The brake pad pressing is carried out at a temperature between 60 and 250° C. at a pressure from 150 to 1800 Kg/cm2 for a duration between 3 and 10 minutes or else preforming the raw mixture within a die and thereafter pressing at a temperature from 100 to 250° C. at a pressure from 150 to 500 kg/cm2 (14.7-49 MPa) for a duration from 3 to 10 minutes.

Alternately, the raw mixture can be molded in order to obtain the block of friction material, which is subsequently glued to the metal support.

The invention also relates to a friction element, in particular a brake pad or brake shoe, presenting a layer or block of friction material made from the friction material of the invention.

The invention finally relates to a braking system comprising an element to be braked constituted by a brake disc or shoe made from cast iron or steel and at least one braking element constituted by a brake pad or brake shoe which is designed to cooperate by means of friction with the element to be braked, wherein the braking element presents a friction layer or block which is intended to cooperate with the element to be braked and which is made using the friction material according to the invention.

The components of the friction material composition or raw mixture to be made according to the invention can be the components used in those friction materials that are already known in the art, with the addition of graphene, as defined above, and preferably, with the simultaneous reduction or complete elimination of graphite. The friction material according to the invention therefore contains graphene and is preferably graphite-free and is also preferably free of copper and/or the alloys thereof, both in the form of powders and fibers. The elimination of copper, preferred in that it is a potentially dangerous component, would seem to be compensated for by graphene, presumably due to its high thermal conductivity.

In particular, the component consisting of fibers may consist of any organic fiber or inorganic fiber other than asbestos, or of any metal fiber which is commonly used in friction materials, preferably with the exclusion of copper and the alloys thereof. Illustrative examples include inorganic fibers such as fiberglass, rock wool, wollastonite, sepiolite and attapulgite, and organic fibers such as carbon fibers, aramid fibers, polyimide fibers, polyamide fibers, phenolic fibers, cellulose and acrylic fibers or PAN (Poly-Acryl-Nitrile), metallic fibers such as, for example, steel fibers, stainless steel, aluminum fibers, zinc, etc.

The fibers can be used in the form of either short fibers or powder.

In order to ensure sufficient mechanical strength, the quantity of fibers is preferably between 2% and 40% by volume compared to the total volume of the friction material and more preferably between 15% and 30% by volume.

Numerous materials known in the art can be used as organic or inorganic fillers. Illustrative examples include calcium carbonate precipitate, barium sulfate, magnesium oxide, calcium hydroxide, calcium fluoride, slaked lime, talc and mica.

These compounds may be used alone or in combinations of two or more of them. The quantity of such fillers is preferably between 2% to 40% by volume based on the total composition of the friction material.

The binder can be any binder known and commonly used in friction materials, therefore even also an inorganic binder of the type recently used in some friction material mixtures. Generally an organic binder is used and in general it is a thermosetting resin or a mixture of thermosetting resins.

Illustrative examples of suitable binders include phenolic resins, melamine resins, epoxy resins; various modified phenolic resins such as epoxy-modified phenolic resins, oil-modified phenolic resins, alkylbenzene-modified phenolic resins and acrylonitrile-butadiene rubber (NBR).

Any one or a combination of one or more of these compounds can be used. In order to ensure sufficient mechanical resistance and wear resistance, the binder is included in an amount preferably between 2% to 50% by volume based upon the total composition of the raw mixture or the final friction material obtained.

The friction modifier (which may include all or part of the filler) may include, in addition to graphene, an organic filler such as cashew nut powder, rubber powder (pulverized tread rubber powder), a variety of non-vulcanized rubber particles, a variety of vulcanized rubber particles, an inorganic filler such as barium sulphate, calcium carbonate, a calcium hydroxide, vermiculite and/or mica, an abrasive such as silicon carbide, alumina, a zirconium silicate, a lubricant such as molybdenum disulfide, a sulfide of tin, a zinc sulfide, iron and non-ferrous sulphides, various metallic particles of copper and copper alloys, and/or a combination of all of the above.

The abrasives used in the present invention can be classified as follows (the following list is only indicative, not necessarily exhaustive and non-limiting):

Mild abrasives (Mohs 1-3): talc, calcium hydroxide, potassium titanate, mica, kaolin;

Medium abrasives (Mohs 4-6): barium sulfate, magnesium oxide, calcium fluoride, calcium carbonate, wollastonite, calcium silicate, iron oxide, silica, chromite, zinc oxide;

Strong abrasives (Mohs 7-9): silicon carbide, zirconium sand, zirconium silicate, zirconia, corundum, alumina, mullite.

The total content of the friction modifier, according to the desired friction characteristics, is preferably between 40% and 80% by volume with respect to the volume of the entire material and in particular, according to a significant aspect of the invention, the graphene content, as defined above, is between 0.1 and 12% by volume with respect to the volume of the entire material and in particular, as well as will be seen from the examples, is preferably between 1 and 10% by volume and still more preferably between 1 and 5% by volume. Therefore, it has been surprisingly found that excessive amounts of graphene, in addition to the high costs, worsen the performance of the friction material, instead of improving them.

Curing and Painting

The pressed article (brake pad) is, where required by the formulation, post-cured by means of heat treatment from 150 to 400° C. for a duration of between 10 minutes to 10 hours, it is then spray-painted or powder-painted, kiln-dried and possibly machined where necessary to produce the final product.

The friction material obtained by means of the method of the invention can be utilized in applications such as disc pads, jaws and linings for automobiles, trucks, railroad cars and other various types of vehicles and industrial machines or else in clutch discs.

BRIEF DESCRIPTION OF THE DRAWINGS

The present invention will now be described in more detail with reference to the following practical non-limiting embodiment examples and with reference to FIGS. 1 to 5 of the appended drawings, wherein:

FIGS. 1(*a*)-1(*c*) illustrate, schematically by means of blocks, several possible implementation methods for a friction material according to the invention;

FIGS. 2(*a*) and 2(*b*) illustrate the results in graphical form of comparative braking efficiency tests according to the AKM standard for the same brake pads made using a current state of the art friction material formulation (FIG. 2*a*) and with essentially the same friction material formulation in which, according to the invention, all of the graphite content has been replaced with a graphene content in a ratio of 10/2 and the graphene blending was carried out using a preferred friction material implementation method according to the invention (FIG. 2*b*);

FIGS. 3(*a*)-3(*c*) illustrate the results in graphical form of comparative braking efficiency tests according to the AKM standard for the same brake pads made using a current state of the art friction material formulation (FIG. 3*a*) and with essentially the same friction material formulation in which, according to the invention, all of the graphite content has been replaced, respectively, with a comparable graphene content (FIG. 3*b*) and all of the graphite content has been replaced with a graphene content in a ratio of 10/2 (2 parts graphene for every 10 parts of replaced graphite. FIG. 3*c*);

FIGS. 4(*a*)-4(*c*) illustrate the results in graphical form of comparative braking efficiency tests according to the AMS standard for the same brake pads as in FIGS. 3(*a*)-3(*c*)

DETAILED DESCRIPTION

The examples and comparative examples are reported here by way of illustration and are not intended to limit the invention.

Figure 1:
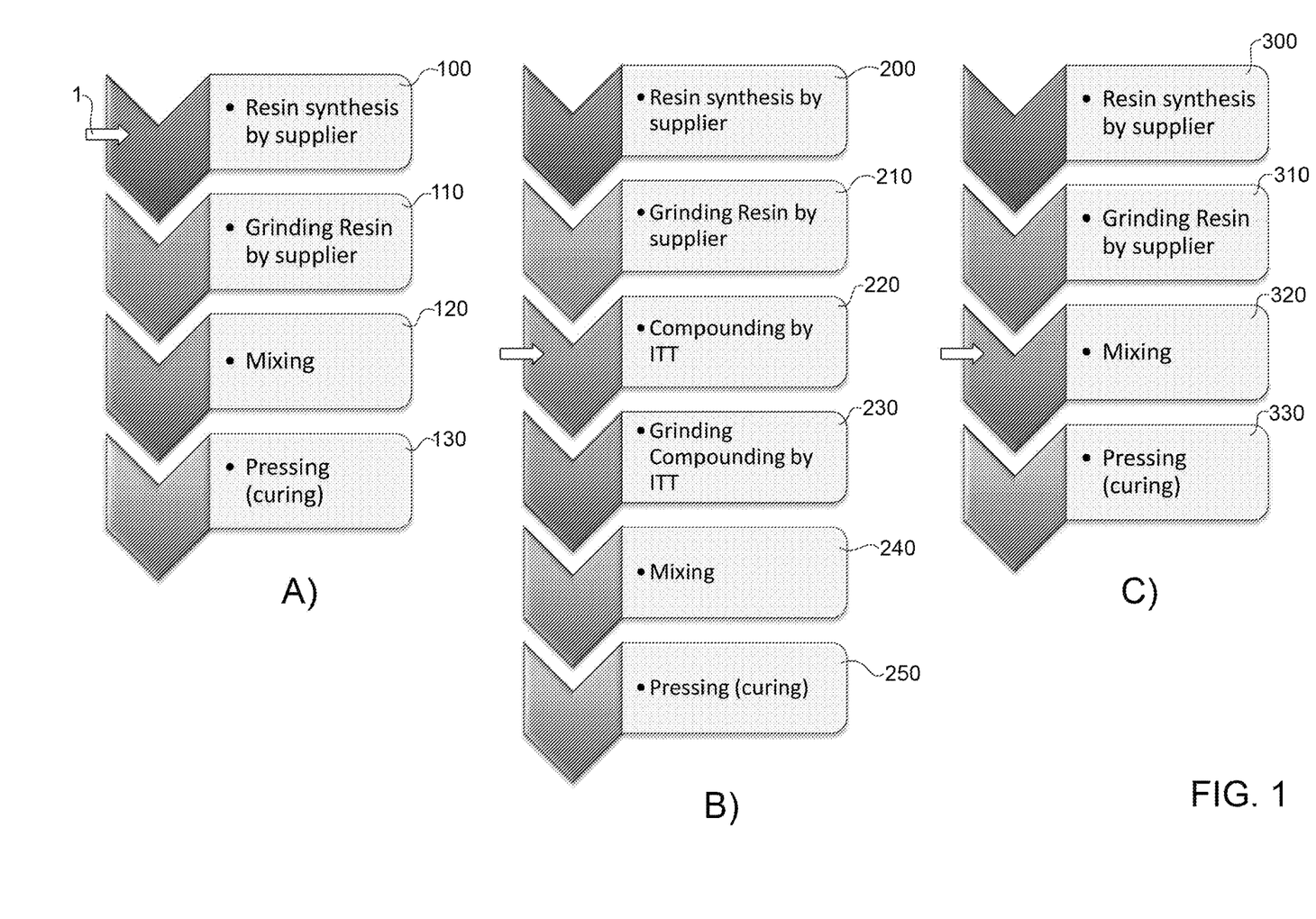

With reference to FIGS. 1(*a*)-1(*c*), three different non-limiting possible forms of implementation are illustrated schematically in blocks of a method for making a block or layer of asbestos-free friction material according to the invention.

With reference to FIG. 1*a*, the block indicated by 100 represents a step in which a synthetic plastic resin or mixture of synthetic plastic resins suitable for being the organic binder of the desired friction material formulation or composition is prepared by the manufacturer by directly adding graphene to it with a microstructure in the form of flakes or scales, to which is normally added a liquid dispersant such as water or an olefin and which presents itself therefore as a suspension or paste; the flakes or scales of graphene have micrometric planar dimensions of a nanometric thickness consisting of a substantially pure graphene mono- or multilayers. The step wherein graphene is added is represented by the arrow indicated by reference number 1 and can take place, for example, directly in the resin while it is still in liquid form. Block 110 is a grinding step for the resin/resins with added graphene, which is always carried out by the manufacturer of the resin/resins. A blending step, represented by block 120, is subsequently performed by the manufacturer of the brake pads wherein the resin/resin blend with added graphene is mixed in a traditional way with all of the other raw components of the blend or formulation or combination of friction materials to be obtained, such as fiber, other friction modifiers and lubricants, fillers, abrasives. The blending step 120 is performed using a known method in a Henschel, Loedige or Eirich type blender. Finally, the brake pad manufacturer performs a step of hot pressing under pressure, indicated by the block 130, this too being performed in a traditional and known way, in order to obtain the complete brake pad or block of friction material which is subsequently glued to a metallic support or backplate.

With reference to FIG. 1*b*, the block denoted by 200 is a step in which a synthetic plastic resin or blend of synthetic plastic resins that are suitable for constituting the organic binder of the formulation or desired composition of the friction material is prepared in the traditional way by the manufacturer. Block 210 represents a grinding step for the resin/resins, which is always performed by the manufacturer of the resin/resins.

A blending step is then performed by the manufacturer of the brake pads, as represented by block 220, in which the resin/blend of resins has, at least partly, graphene directly added to it with a microstructure in the form of flakes or scales with micrometric planar dimensions and a nanometric thickness consisting of a substantially pure graphene mono- or multilayers; the graphene addition step is represented by the arrow shown with the reference number 1 and graphene is added in the form of a solid.

Figure 5:
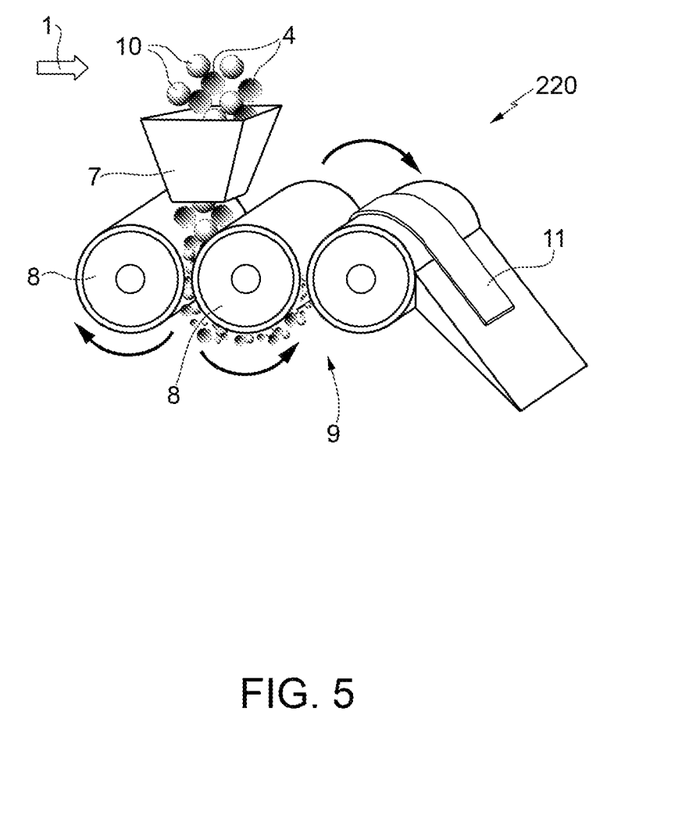
FIG. 5 illustrates schematically a characteristic step of the preferred method of implementation of the friction material according to the invention.

The block denoted by 220 represents a characteristic step of the production method of the invention for obtaining brake pads and is explained schematically in FIG. 5. This step consists in hot blending graphene and possibly other components of the raw mixture or formulation or composition of the friction material to be obtained, such as fibers, other friction modifiers or lubricants, fillers, abrasives, with all or part of the synthetic resin/blend of synthetic plastic resins that has/have been chosen for the organic binder. Preferably, at this stage all of the organic binder, schematically indicated with reference 4, and which is solid and in the form of a powder or granules, all the graphene, schematically indicated with the reference 10 and acquired from the brake pads manufacturer on the market as graphene ULTRA or PURE GRAPHEME G+® by the company DIRECTA PLUS and optionally one or more possible other components of the raw friction material (not shown for simplicity), are intimately blended together according to the prospective expansion of the block 220 shown schematically in FIG. 5, being fed with graphene 10 as indicated by the arrow 1 and the binder 4, within a hopper 7 and made to fall from said hopper, under atmospheric pressure conditions, between two (or more) heated and motorized counter-rotating rollers 8.

The binder 4 is, according to this embodiment, necessarily an organic binder consisting of a resin or mixture of thermosetting resins.

The rollers 8 are heated to a higher temperature than the softening temperature and, preferably, higher than the complete melting temperature of the organic binder but below the polymerization or curing temperature of the organic binder, in such a way as to bring the organic binder up to a temperature that is greater than or equal to the softening temperature but lower than its polymerization temperature in order to maintain the ability of the organic binder to soften or liquefy again.

The rollers 8 and the hopper 7 form part of a rolling mill blender 9 which is open to the atmosphere, therefore not pressurized. Within this blender 9 the raw material components of the desired friction material, in particular at least graphene 10 and the organic binder 4, are subjected to a high shear stress in the presence of the organic binder in the fluid state, such as to blend them uniformly. At the output of roller mixer 9 a solid semi-finished product 11 is produced in the form of chips or ribbon or sheet containing graphene which is uniformly dispersed within a matrix consisting of the polymeric resin/resins.

The rollers 8 are made to rotate at a speed between 10 and 30 revolutions/minute and are maintained at a temperature of between 40 and 150° C. The gap between the rollers 8, which determines the magnitude of the applied shear stress and the thickness of the semi-finished product 11 at the output is between 0.01 and 5 mm.

The next block, indicated with 230, represents a grinding step, preferably performed in a ball mill or in known types of hammers, of the semi-finished product 11, which is reduced to the form of a powder. Such a powder is also preferably subjected to sieving and made to have a controlled particle size distribution of between 5 and 500 microns.

The block denoted by 240 is a traditional type mixing step of all of the other raw components of the mixture or formulation or composition of the friction material to be obtained, for example fibers, other friction modifiers or lubricants, fillers, abrasives, not previously blended at step number 220. This blending step 240 occurs in a known manner in a Henschel, Loedige or Eirich type blender. Finally, the brake pad manufacturer performs a step of hot pressing under pressure, indicated by the block 250, this too being performed in a traditional and known way, in order to obtain the complete brake pad or block of friction material which is subsequently glued to a metallic support or backplate.

With reference to FIG. 1c, the block denoted by 300 is a step in which a synthetic plastic resin or blend of synthetic plastic resins that are suitable for comprising the organic binder of the formulation or desired composition of the friction material is prepared in the traditional way by the manufacturer. Block 310 represents a grinding step for the resin/resins, which is always performed by the manufacturer of the resin/resins.

A blending step is then performed by the manufacturer of the brake pads as represented by block 320, in which the first resin/blend of resins has graphene directly added to it with a microstructure in the form of flakes or scales with micrometric planar dimensions of a nanometric thickness consisting of a substantially pure graphene mono- or multilayers in the form of a solid powder; the graphene addition step is represented by the arrow shown with the reference number 1. In this blending step 320, together with graphene, or preferably subsequently, also added to the resin/blend of resins are all of the other raw components of the mixture or formulation or composition of the friction material to be obtained, for example fibers, other friction modifiers or lubricants, fillers, abrasives. The blending step 320 is performed using a known method in a Henschel, Loedige or Eirich type blender. Finally, the brake pad manufacturer performs a step of hot pressing under pressure, indicated by the block 330, this too being performed in a traditional and known way, in order to obtain the complete brake pad or block of friction material which is subsequently glued to a metallic support or backplate.

Example—1

Two formulations, which are marked as "Reference 1" and "Compounding" were prepared; the formulation "Reference 1" represents a typical formulation of NAO type friction material which is in common use and obtained in a known manner by mixing all of its components within a Loedige blender; the "Compounding" formulation is substantially identical to that of the reference, except for the replacement of graphite with a lower amount of graphene in a 10/2 ratio (i.e. 10 parts of graphite are replaced with 2 parts of graphene), and is obtained by the production process schematically shown in FIG. 1b, to which graphene, instead of being added in a traditional blending step within a Henschel, Loedige or Eirich type blender, is added to the organic binder in the fluid state within the blender 9 of FIG. 4.

The compositions of the two formulations described above are shown in table 1 below.

TABLE 1

|  | Reference 1 % Vol | Compounding % Vol |
|---|---|---|
| Aramid fiber | 6 | 6 |
| Friction powder | 14 | 15 |
| Resin | 21 | 22 |
| Medium abrasive | 25 | 26 |
| Strong abrasive | 2 | 2 |
| Sulfides | 4 | 4 |
| graphene | 0 | 1 |
| Mild abrasive | 20 | 21 |
| Coke | 3 | 3 |
| Graphite | 5 | 0 |
| Total | 100 | 100 |

In the case of the "Compounding" mixture all of the phenolic resin and 100% of the graphene were treated according to the preferred method of the invention in a hot-roller mixer at a temperature of 75° C., with the rollers rotating at a speed of 20 g/min. and with a gap between the rollers of 1 mm, obtaining a semi-finished product in sheet form with a thickness of 1.3 mm, which was subsequently ground and sieved to obtain a powder having a particle size of between 5 and 500 microns and preferably comprising of between 5 and 250 microns. The powder was mixed with the remaining components in a Loedige blender.

Subsequently, the two compounds/compositions were subjected to an identical pressing and heat treatment process, subjecting them to pressing within a die under a pressure of 20 tons for 3 minutes at a temperature of 160° C., they were then cured with 240 minutes of thermal treatment at 210° C., thus producing brake pads with a friction material of a substantially identical composition, except for the replacement of graphite with graphene, but obtained using different processes.

The brake pads produced by using the described method were subjected to an efficiency test according to the AKM standard, comprising: bedding in braking events, braking events at different fluid pressures, "cold" evaluation braking events (<50° C.), freeway simulation braking events, two series of high energy braking events (first FADE test) interspersed by a series of regenerative braking events. From this test it is also possible to extrapolate, in a manner known to a person skilled in the art, the wear to which the pad is subjected.

Figure 2:
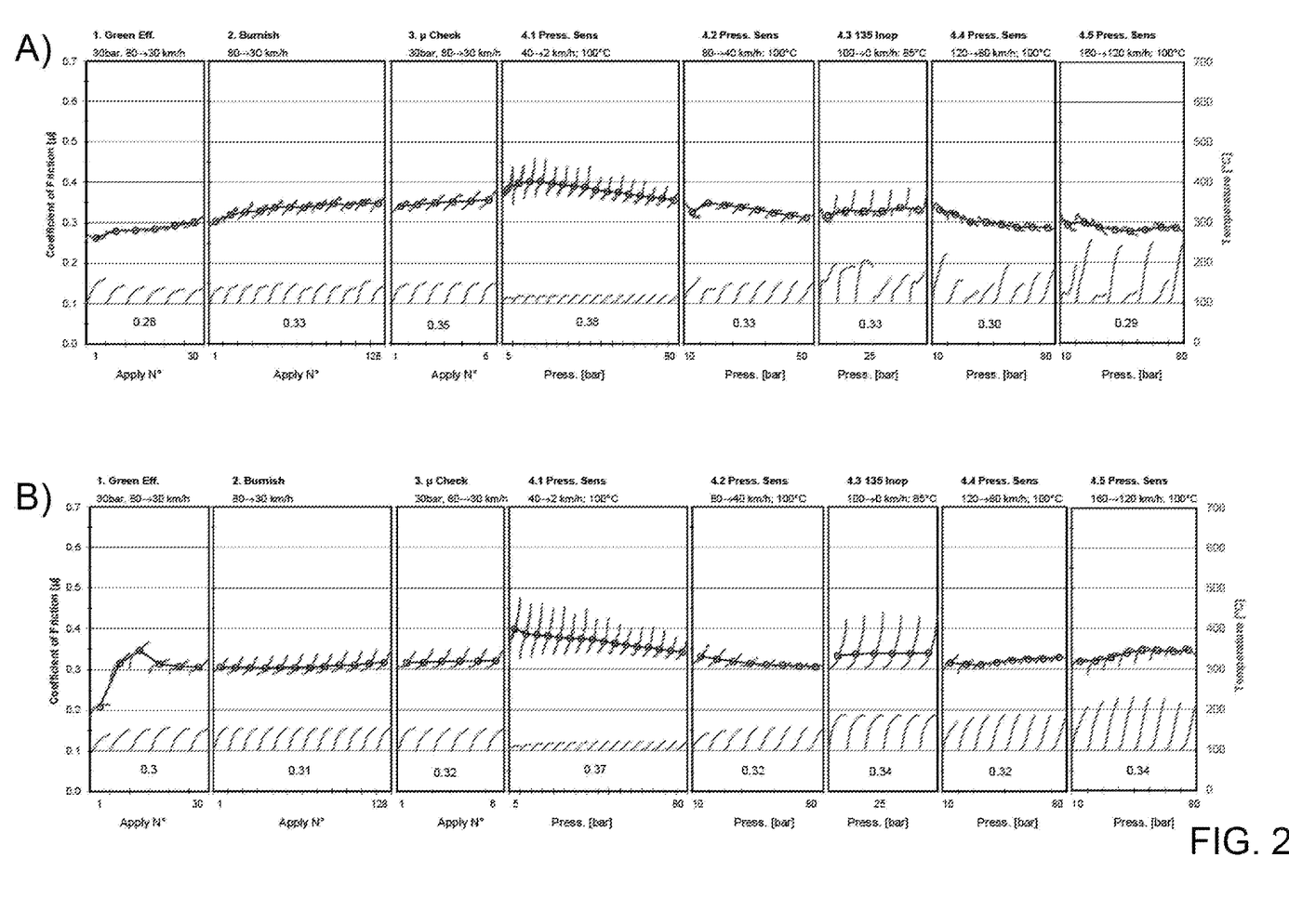

The test results are shown in FIGS. 2 a) and 2 b). From an examination of the FIGS. 2a and 2b it is evident how the coefficient of friction is kept more constant under the same conditions as in the case of the "Compounding" mixture, revealing a behavior that is clearly superior to the "Reference 1" mixture of the traditional type.

Example—2

Three formulations were prepared, which are marked as "Reference 2", "Graphite/Graphene (1:1)" and "Graphite/Graphene (10:2)" according to the quantities given in Table 2.

TABLE 2

|  | Reference 2 | Graphite/Graphene (1:1) | Graphite/Graphene (10:2) |
| --- | --- | --- | --- |
| Aramid fiber | 4 | 4 | 4 |
| Resin | 20 | 20 | 20 |
| Graphite | 5 | 0 | 0 |
| Graphene | 0 | 5 | 1 |
| Mild abrasive | 10 | 10 | 11 |
| Strong abrasive | 9 | 9 | 10 |
| Medium abrasive | 10 | 10 | 11 |
| Sulfides | 4 | 4 | 4 |
| Coke | 20 | 20 | 21 |
| Metallic fibers | 14 | 14 | 14 |
| Metallic powders | 4 | 4 | 4 |
| Total | 100 | 100 | 100 |

The "Reference 2" formulation represents a typical formulation of NAO type friction material which is in common use and similar to the "Reference 1" formulation of example 1. The "Graphite/Graphene (1:1)" formulation is substantially identical to the "Reference 2" formulation except for the fact that the graphite content was fully replaced with an equal amount of graphene. The "Graphite/Graphene (10:2)" formulation is substantially identical to that of the reference except for the replacement of graphite with a lower amount of graphene at a ratio of 10/2 (i.e. 10 parts of graphite are replaced with 2 parts of graphene).

The components shown in Table 2, which indicates values of % by volume, graphene, the binder and the other components, were uniformly blended all together within a Loedige blender.

Subsequently all three mixtures/compositions were subjected to the same pressing and heat treatment process as in example 1.

The brake pads produced as described were subjected to the following tests:

Efficiency tests according to the AKM standard, comprising: bedding in braking events, braking events at different fluid pressures, "cold" evaluation braking events (<50° C.), freeway simulation braking events, two series of high energy braking events (first FADE test) interspersed by a series of regenerative braking events. From this test it is also possible to extrapolate, in a manner known to a person skilled in the art, the wear to which the pad is subjected.

Figure 3:
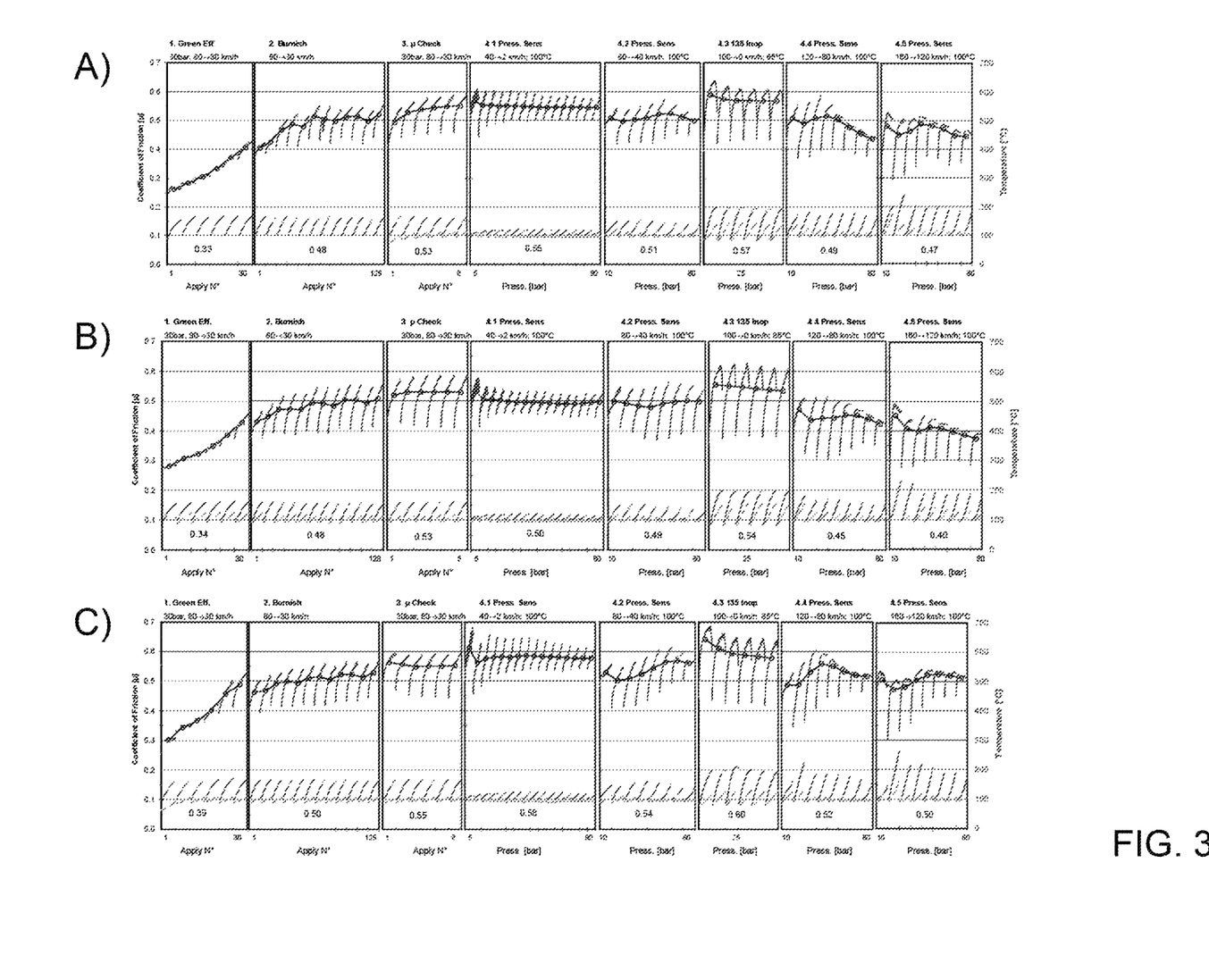

The results obtained are illustrated in FIGS. 3a, 3b and 3c, where FIG. 3a relates to the reference mixture, FIG. 3b to the mixture with a replacement of 1:1 and FIG. 3c to the mixture with a replacement of 10:2. It can be noted that whilst there is a reduction in the friction coefficient in the case of the mixture according to the invention with a replacement of 1:1, this effect is much less evident in the mixture according to the invention with a replacement of 10:2

Figure 4:
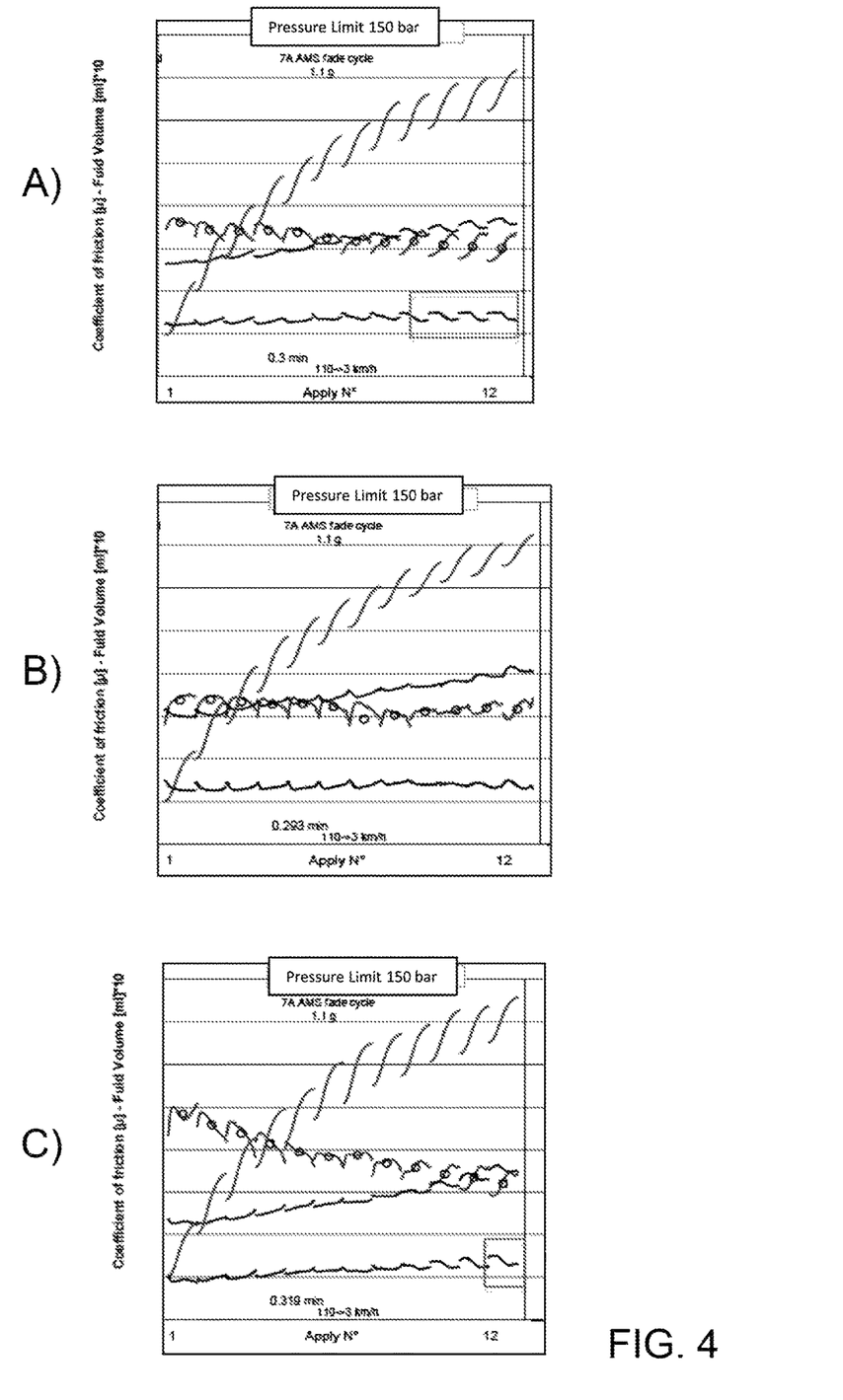

Efficiency test according to the AMS standard, with which the behavior when hot can be evaluated. As is evident from the results reported in FIGS. 4A (reference mixture), 4B (mixture with a replacement of 1:1) and 4C (mixture with a replacement of 10:2), the behavior when hot improves markedly compared to the reference mixture; in particular, with the reference mixture, the pressure already goes into saturation several braking events before the end of the test (see values included in the rectangle indicated by the arrow); with the mixture with a replacement of 10:2 the pressure goes into saturation only at the last braking event and in the case of the mixture with a replacement of 1:1, the pressure never goes into saturation.

Example—3

From the efficiency tests according the AKM standard of example 1, the wear data reported in Table 3 are extrapolated, which relate to braking tests on cast iron brake discs.

TABLE 3

| FORMULA | Reference 1 | Compound |
| --- | --- | --- |
| Pad Wear [gr] | 6.2 | 4.3 |
| Disc Wear [gr] | 13.3 | 7.8 |

Comparing the wear of the brake pads and of the relative disc ("braking partner" in the technical language) it can be noted that the replacement of graphite with graphene leads to less pad wear even with a reduced amount of graphene (replacement of 10:2) in the case of the "Compounding" mixture, where the reduced amount of graphene is added using the preferred method of the invention by means of the roller mixer 9 of FIG. 5. The disc wear is also reduced.

The objectives of the invention are therefore fully achieved.

The invention claimed is:

1. An asbestos-free friction material in a vehicle braking element, the vehicle braking element comprising a heat-pressed block of the asbestos-free friction material glued to a metal support, the asbestos-free friction material comprising:
   inorganic and/or organic and/or metallic fibers consisting of between 15-30 percent of the total volume of the asbestos-free friction material;
   at least one organic thermosetting binder, wherein the at least one organic thermosetting binder is one or a combination of a phenolic resin, a melamine resin and an epoxy resin, wherein the at least one organic thermosetting binder optionally comprises an inorganic binder;
   the at least one organic thermosetting binder being between 2-50 percent of the total volume of the asbestos-free friction material;
   at least one friction modifier or lubricant including a carbonaceous material; and
   at least one filler or abrasive,
   wherein the at least one friction modifier may include the at least one filler,
   wherein the carbonaceous material is constituted in part by a microstructure in flakes or scales of micrometric planar dimensions and of nanometric thickness consisting of substantially pure graphene mono- or multilayers, in which the total amount of substantially pure graphene present is between 0.1 and 12% by volume of the total volume of the asbestos-free friction material, and wherein the substantially pure graphene is present in the form of a solid semi-finished product in which the entire amount of substantially pure graphene had been initially mixed with at least a part of the at least one organic thermosetting binder in a hot blending step between a set of hot rollers at a temperature lower than the curing temperature of the at least one organic thermosetting binder, but higher than the melting temperature of the at least one organic thermosetting binder to create a fluid state for enabling the substantially pure graphene to be mixed with the at least one organic thermosetting binder which had then been cooled to form a solid semi-finished product that was ground and sieved into a powder form having a particle distribution between 5 and 500 microns prior to mixing with the remaining components of the asbestos-free friction material and in which the substantially pure graphene had been evenly dispersed within a matrix formed by part of the at least one organic thermosetting binder and in which the substantially pure graphene consists of carbon having a weight percentage of greater than 98 percent, oxygen having a weight percentage of less than 0.6 percent, and sulfur having a weight percentage of less than 0.2 percent, wherein the asbestos-free friction material is free of graphite and wherein the asbestos-free friction material has been heat pressed into the block under pressure for adhesion to the metal support of the braking element.

2. The asbestos-free friction material according to claim 1, wherein the carbonaceous material consists at least in part of substantially pure graphene flakes or scales having lateral dimensions of between 1 and 50 microns and a thickness of between 0.142 nm and 40 nm, evenly dispersed within the matrix formed by the at least one organic thermosetting binder.

3. The asbestos-free friction material according to claim 1, wherein the carbonaceous material consists at least in part of substantially pure graphene flakes or scales having lateral dimensions smaller than 10 microns and a thickness smaller than 4 nm, evenly dispersed within the matrix formed by the at least one organic thermosetting binder.

4. The asbestos-free friction material according to claim 1, wherein the asbestos-free friction material is free of copper or copper alloys and/or fibers of copper or copper alloys.

5. The asbestos-free friction material according to claim 1, in which the carbonaceous material includes substantially pure graphene in an amount between 1 and 5% by volume of the total volume of the asbestos-free friction material.

6. A braking system including an element to be braked consisting of a disc or brake drum made of a cast iron or steel and at least one braking element consisting of a brake pad or brake shoe suitable to cooperate by means of friction with the element to be braked, wherein the braking element has a friction layer or block which is intended to cooperate with the element to be braked, which friction layer or block has been made of the asbestos-free friction material according to claim 1.

7. A method for making a block or layer of asbestos-free friction material comprising:
mixing respective component materials of the asbestos-free friction material comprising:
inorganic and/or organic and/or metallic fibers consisting of between 15-30 percent of the total volume of the asbestos-free friction material;
at least one organic thermosetting binder, wherein the at least one organic thermosetting binder is one or a combination of a phenolic resin, a melamine resin and an epoxy resin, wherein the at least one organic thermosetting binder optionally comprises an inorganic binder;
the at least one organic thermosetting binder being between 2-50 percent of the total volume of the asbestos-free friction material;
at least one friction modifier or lubricant including a carbonaceous material; and
at least one filler or abrasive, wherein the at least one friction modifier may include the at least one filler;
blending, together with one or more of said component materials, a carbonaceous material constituted by a microstructure in flakes or scales of micrometric planar dimensions and of nanometric thickness consisting of a substantially pure graphene monolayer or multilayers in an amount comprised between 0.1 and 12% by volume on the total volume of the entire asbestos-free friction material,
wherein the asbestos-free friction material is free of graphite, and wherein the substantially pure graphene consists of carbon with a weight percentage of greater than 98 percent, oxygen having a weight percentage of less than 0.6 percent, and sulfur having a weight percentage of less than 0.2 percent.

8. The method according to claim 7, wherein the substantially pure graphene having has lateral dimensions of between 1 and 50 microns and a thickness of between 0.142 and 40 nm.

9. The method according to claim 7, further comprising:
mixing together the component materials of the asbestos-free friction material in order to obtain a raw mixture; and
pressing the raw mixture under pressure in order to obtain a block or layer of asbestos-free friction material; the mixing step comprising:
a) a first step of blending at high temperature and by a first mixer of a roller that is open to atmospheric pressure, at least part of the at least one organic thermosetting binder and at least part of the substantially pure graphene, operating at a temperature lower than the polymerization temperature of the at least one organic thermosetting binder but greater than, or equal to, the softening temperature of the at least one organic thermosetting binder, in order to obtain a solid semi-finished product in the shape of chips or ribbon or sheet;
b) a step of grinding the solid semi-finished product containing the substantially pure graphene in order to reduce the solid semi-finished product to a powder; and
c) a second blending step wherein the powder obtained by grinding the solid semi-finished product is mixed with the remaining materials comprising the asbestos-free friction material.

10. A braking system including an element to be braked consisting of a disc or brake drum made of a cast iron or steel and at least one braking element consisting of a brake pad or brake shoe suitable to cooperate by means of friction with the element to be braked, characterized in that the braking element has a friction layer or block which is intended to cooperate with the element to be braked, which friction layer or block has been made by the method of claim 7.

\* \* \* \* \*